UNITED STATES PATENT OFFICE.

HEINRICH CARO, OF MANNHEIM, GERMANY, AND ALFRED KERN, OF BASLE, SWITZERLAND, ASSIGNORS TO THE BADISCHE ANILIN AND SODA FABRIK, OF MANNHEIM, GERMANY.

MANUFACTURE OF DYE-STUFF.

SPECIFICATION forming part of Letters Patent No. 290,856, dated December 25, 1883.

Application filed September 14, 1883. (No specimens.)

*To all whom it may concern:*

Be it known that we, HEINRICH CARO, a subject of the Grand Duke of Baden, residing at Mannheim, in the Empire of Germany, and ALFRED KERN, a citizen of the Swiss Republic, residing at Basle, in Switzerland, have invented new and useful Improvements in the Manufacture of Dye-Stuff or Coloring-Matter, of which the following is a specification.

This invention relates to an improvement in the manufacture of a purple dye-stuff or coloring-matter which we term "crystallized methyl-violet," and which has been made the subject-matter of a separate application for Letters Patent bearing even date with this by ALFRED KERN, one of the above-named petitioners.

According to the process hereinafter described, crystallized methyl-violet may be produced by the reaction of oxychloride of carbon (phosgene) upon a mixture of diamethyl-aniline and in the presence of anhydrous chloride of aluminium.

In carrying out our invention we take about twenty parts, by weight, of dimethyl-aniline and add to it gradually and under constant stirring about five parts, by weight, of anhydrous chloride of aluminium. To the mixture or solution thus obtained we then add about three parts, by weight, of oxychloride of carbon, (phosgene,) with due care to prevent a considerable rise of temperature above about 30° centigrade. The oxychloride of carbon may be employed either in its gaseous or in its liquefied condition, or in a state of solution in a suitable indifferent solvent—such, for instance, as benzine. The reaction quickly sets in and manifests itself by the rapid development of color. We allow the same to proceed at a temperature of about from 20° to 30° centigrade during from five to six hours, or until the deep blue or purple tint of the mixture no longer appears to increase in intensity. We then separate the coloring-matter thus produced from the dimethyl-aniline which has remained unacted upon, and from other products contained in the said mixture, by employing any of the various methods in use for a similar purpose. For instance, we first boil the crude coloring-matter with water until dimethyl-aniline or any other volatile products are volatilized and recovered by distillation, and we then precipitate the solution thus obtained by the addition of common salt, whereby a crystalline precipitate of the coloring-matter will be obtained, which may afterward be recrystallized from its solution in boiling water; or we may treat the crude coloring-matter first with caustic soda liquor in excess, in order to liberate the organic bases contained therein, and we may then distill off the dimethyl-aniline and convert the base of the methyl-violet thus obtained into its hydrochlorate sulphate or oxalate by the addition of the corresponding acids and by subsequent crystallization from water.

The coloring-matter obtained by the process hereinbefore described presents, as far as we have been able to ascertain, the general characteristics of crystallized methyl-violet—a dye-stuff or coloring-matter described and claimed in a separate application for Letters Patent bearing even date with this by ALFRED KERN, one of the above-named petitioners.

We are aware that it is not new to methylize benzine homologues by aluminium chloride.

What we claim as new, and desire to secure by Letters Patent, is—

The improved process for manufacturing crystallized methyl-violet by the reaction of oxychloride of carbon (phosgene) upon a mixture of dimethyl-aniline and anhydrous chloride of aluminium, and then separating the coloring-matter, as set forth.

In testimony whereof we have hereunto set our hands and seals in the presence of two subscribing witnesses.

HEINRICH CARO. [L. S.]
    ALFRED KERN. [L. S.]

Witnesses:
 WILHELM FRICKER,
 JOHANNES BJTTNEY.